United States Patent
Kawamura et al.

(10) Patent No.: US 11,603,068 B2
(45) Date of Patent: Mar. 14, 2023

(54) AIRBAG APPARATUS

(71) Applicant: TOYODA GOSEI CO., LTD., Kiyosu (JP)

(72) Inventors: Yusuke Kawamura, Kiyosu (JP);
Masaaki Okuhara, Kiyosu (JP);
Motoyuki Tanaka, Kiyosu (JP);
Toshihito Yanagisawa, Kiyosu (JP);
Hitomi Takahashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/537,967

(22) Filed: Nov. 30, 2021

(65) Prior Publication Data

US 2022/0203921 A1 Jun. 30, 2022

(30) Foreign Application Priority Data

Dec. 24, 2020 (JP) .............................. JP2020-214510

(51) Int. Cl.
*B60R 21/207* (2006.01)
*B60R 21/231* (2011.01)

(52) U.S. Cl.
CPC .. *B60R 21/207* (2013.01); *B60R 2021/23107* (2013.01); *B60R 2021/23153* (2013.01)

(58) Field of Classification Search
None
See application file for complete search history.

(56) References Cited

U.S. PATENT DOCUMENTS

| | | | |
|---|---|---|---|
| 9,592,788 B2 | 3/2017 | Wiik et al. | |
| 10,569,732 B2* | 2/2020 | Nagasawa | B60R 21/207 |
| 10,759,376 B2* | 9/2020 | Jindal | B60R 21/20 |
| 10,933,836 B2* | 3/2021 | Yoo | B60R 21/207 |
| 11,214,226 B2* | 1/2022 | Nagasawa | B60R 21/207 |
| 11,390,235 B2* | 7/2022 | Kim | B60R 21/233 |
| 2006/0131847 A1 | 6/2006 | Sato et al. | |
| 2018/0281723 A1* | 10/2018 | Nagasawa | B60N 2/753 |
| 2019/0077359 A1* | 3/2019 | Kim | B60R 21/01512 |
| 2021/0402949 A1* | 12/2021 | Sung | B60R 21/207 |

FOREIGN PATENT DOCUMENTS

| | | |
|---|---|---|
| JP | 2006-008105 A | 1/2006 |
| JP | 2014-054956 A | 3/2014 |
| JP | 2020-011639 A | 1/2020 |
| JP | 2020-023209 A | 2/2020 |

* cited by examiner

*Primary Examiner* — Faye M Fleming
(74) *Attorney, Agent, or Firm* — Posz Law Group, PLC (57) ABSTRACT

An airbag apparatus includes two airbags. The airbags are respectively accommodated in side accommodation portions in a seat back. The airbags include two side inflation portions and two front inflation portions. Each airbag further includes a tether. Each airbag includes a non-inflation portion. Each tether includes a pass-through section at which the tether is passed through the non-inflation portion. A portion of each tether between the pass-through section and a distal end is arranged along a rear surface of the front inflation portion. A portion of each tether between the pass-through section and a basal end is arranged along an inner surface of the side inflation portion. The basal end of each tether is configured to be fixed to a rear end of the side inflation portion or the seat back. The distal end of each tether is fixed to a front end of the front inflation portion.

4 Claims, 5 Drawing Sheets

AIRBAG APPARATUS

BACKGROUND

1. Field

The present disclosure relates to an airbag apparatus that is configured to protect an occupant seated in a vehicle seat with an airbag from an impact.

2. Description of Related Art

An airbag apparatus is known as an apparatus that protects an occupant from an impact when the impact force is applied to the vehicle from ahead or diagonally ahead of the land vehicle seat. A typical airbag apparatus includes two airbags. Each airbag includes multiple inflation portions (for example, six inflation portions), a first tether, a second tether, and a gas supply passage. The inflation portions of each airbag are arranged in a row so as to be stacked from the upstream side toward the downstream side in the deployment direction. The first tether of each airbag couples upstream ends of the inflation portions together. The second tether of each airbag couples downstream ends of the inflation portions together. The gas supply passage of each airbag is continuous with the inflation portions.

The above-described airbag apparatus supplies inflation gas to the respective inflation portions of each airbag through the gas supply passage. The shapes of the inflation portions when deployed and inflated are restricted by the first tether and the second tether. Adjacent inflation portions are brought into contact with each other, so that a reaction force is generated between the inflation portions.

Thus, in each airbag, the reaction force of each inflation portion and the tension of the tethers determine the positions of the inflation portions. This limits deformation and displacement of each inflation portion when it is deployed and inflated. When an impact force is applied to the vehicle from ahead or diagonally ahead of the land vehicle seat, for example, due to a collision, the occupant starts moving in the direction of the impact force due to inertia. The two airbags restrict the occupant from moving relative to the land vehicle seat. This reduces the impact caused by contact between the occupant and components of the vehicle, thereby protecting the occupant from the impact.

In each airbag of the typical airbag apparatus, the inflation portions (the number of which, for example, is six) are arranged in a single row while being respectively continuous with the gas supply passage. The upstream ends of the inflation portions are coupled together with the first tether, and the downstream ends are coupled together with the second tether. In this manner, the airbag includes a large number of inflation portions and a large number of tethers. Further, all the inflation portions each need to have a joint portion at which the upstream end is joined to the first tether, and a joint portion at which the downstream end is joined to the second tether. In other words, the first tether includes a relatively large number of sections joined to the upstream ends of the inflation portions. Likewise, the second tether includes a relatively large number of sections joined to the downstream ends of the inflation portions. This complicates the structure of each airbag, making the manufacture burdensome. The above-described drawbacks can also be found in a case in which the typical airbag apparatus is employed in a vehicle seat that is not a land vehicle seat.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, an airbag apparatus configured to be used for a vehicle seat is provided. The vehicle seat includes a seat back. A side closer to a center in a width direction of the seat back is defined as an inner side, and a side farther from the center is defined as an outer side. The seat back includes side accommodation portions respectively provided in side portions on the outer sides. The airbag apparatus comprising two airbags respectively accommodated in the accommodation portions. The airbags have bent shapes that include two side inflation portions that are configured to be supplied with inflation gas and to be deployed and inflated from the side accommodation portions to positions forward of a thorax of an occupant seated in the vehicle seat. The bent shapes also include two front inflation portions that are coupled to front ends of the side inflation portions and configured to be deployed and inflated toward the inner side by the inflation gas that has flowed through the side inflation portions. Each airbag further includes a tether that is configured to become taut as the airbag is deployed and inflated so as to restrict and maintain the airbag at the bent shape. Each airbag includes a non-inflation portion between the side inflation portion and the front inflation portion. Each tether includes a pass-through section at which the tether is passed through the non-inflation portion. A portion of each tether between the pass-through section and a distal end is arranged along a rear surface of the front inflation portion. A portion of each tether between the pass-through section and a basal end is arranged along an inner surface in the width direction of the side inflation portion. The basal end of each tether is configured to be fixed to a rear end of the side inflation portion or the seat back. The distal end of each tether is fixed to a front end of the front inflation portion.

In a second general aspect, an airbag apparatus configured to be used for a vehicle seat is provided. The vehicle seat includes a seat back. A side closer to a center in a width direction of the seat back is defined as an inner side, and a side farther from the center is defined as an outer side. The seat back includes side accommodation portions respectively provided in side portions on the outer sides. An intermediate accommodation portion is provided between the side accommodation portions. The airbag apparatus comprises two airbags respectively accommodated in the side accommodation portions. The airbags have bent shapes that include two side inflation portions that are configured to be supplied with inflation gas and to be deployed and inflated from the side accommodation portions to positions forward of a thorax of an occupant seated in the vehicle seat. The bent shapes also include two front inflation portions that are coupled to front ends of the side inflation portions and configured to be deployed and inflated toward the inner side by the inflation gas that has flowed through the side inflation portions. Each airbag further includes a tether that is configured to become taut as the airbag is deployed and inflated so as to restrict and maintain the airbag at the bent shape. The airbag apparatus further comprises an airbag for protecting a rear seat occupant that is configured to be accommodated in the intermediate accommodation portion and to be deployed and inflated rearward from the intermediate accommodation portion by inflation gas. A basal end of each tether is fixed to a portion of the airbag for protecting a rear seat occupant that is deployed and inflated at a position rearward of the intermediate accommodation portion. A distal end of each tether is fixed to a front end of the front inflation portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

An airbag apparatus 20 for protecting a front seat occupant in a land vehicle 10 according to a first embodiment will now be described with reference to FIGS. 1 to 6. In the first embodiment, the land vehicle 10, on which the airbag apparatus 20 is mounted, has an autonomous driving feature.

In the following description, the up-down direction refers to the vertical direction (see, for example, direction description shown in FIG. 1). It is now assumed that a front seat occupant P1 having a size equivalent to a crash test dummy is seated in a land vehicle seat 11 in a normal posture suitable for manual driving of the land vehicle 10.

Figure 1:
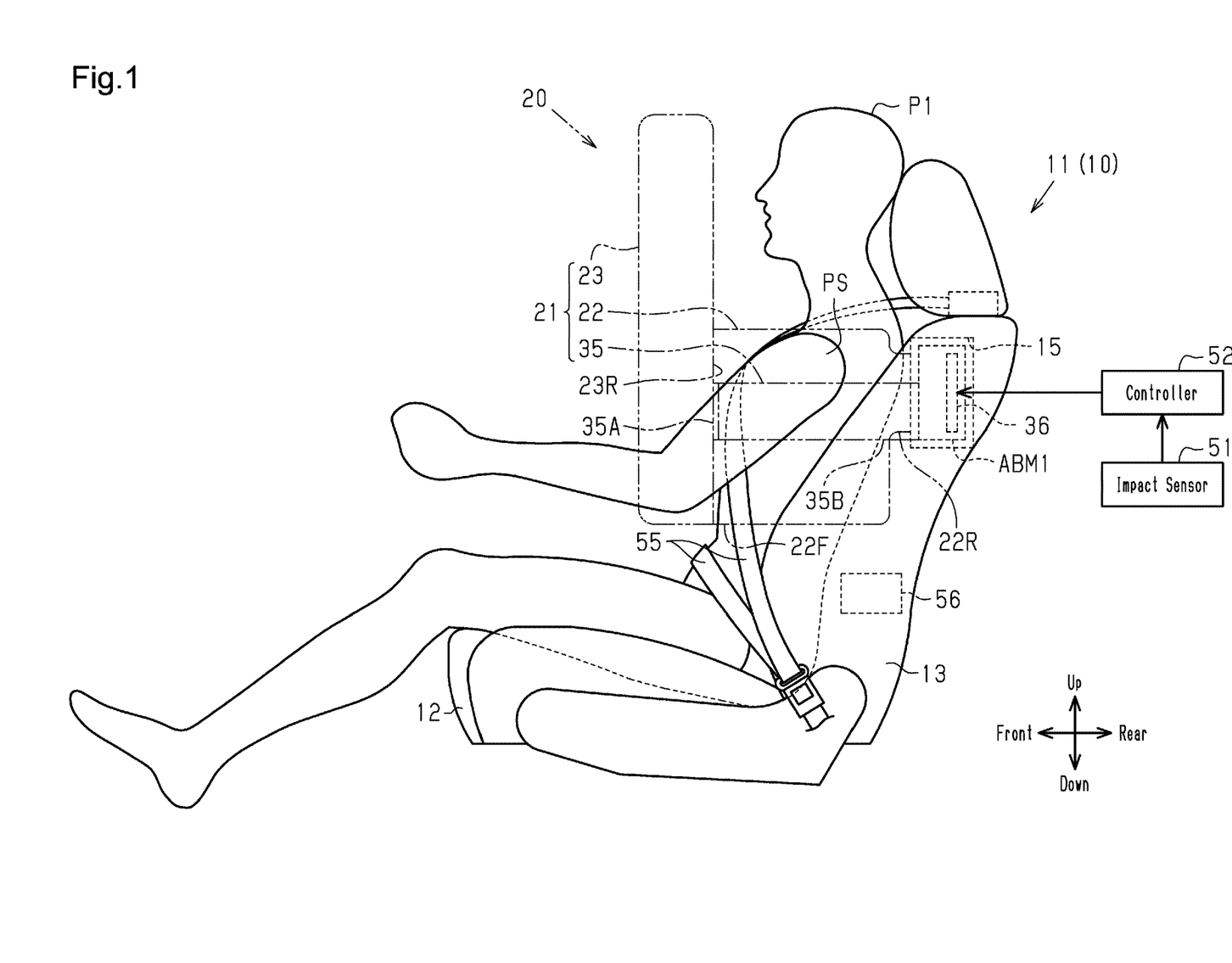
FIG. 1 is a partial side view illustrating an airbag apparatus according to a first embodiment, together with a land vehicle seat and an occupant.
Figure 2:
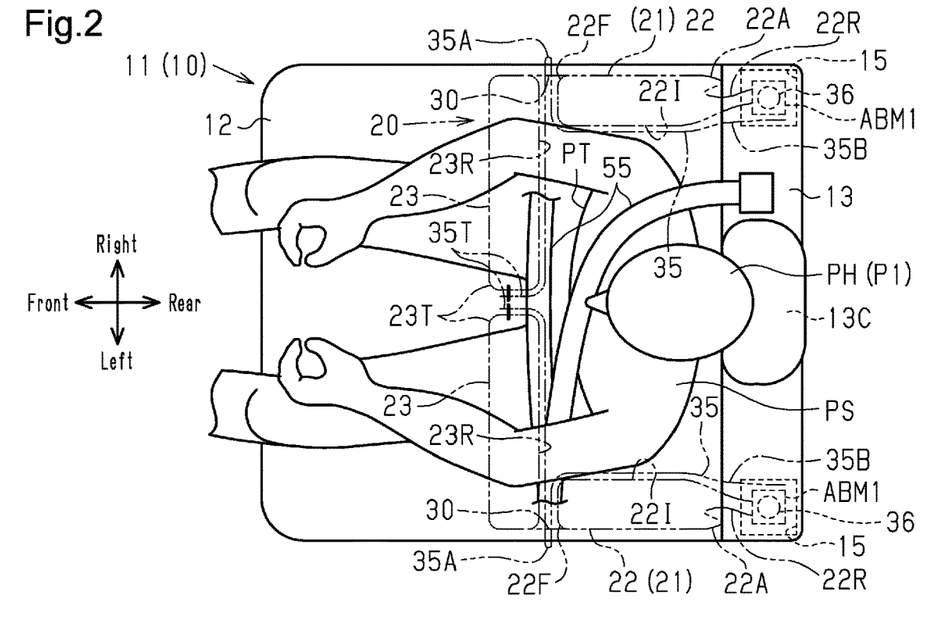
FIG. 2 is a partial plan view illustrating the airbag apparatus according to the first embodiment, together with the land vehicle seat and the occupant.
Figure 3:
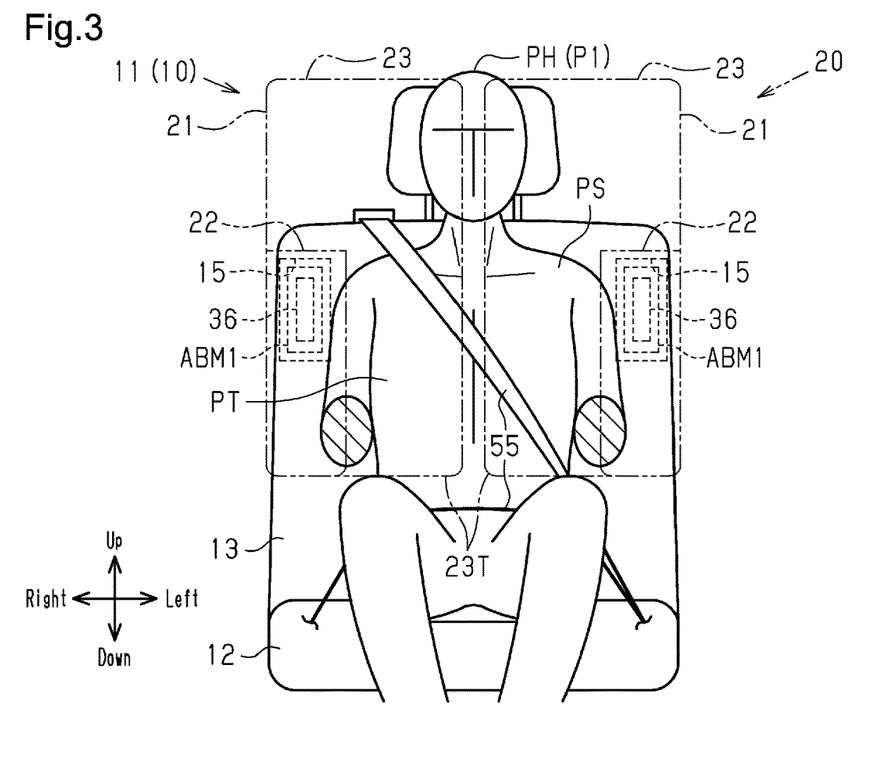
FIG. 3 is a partial front view illustrating the airbag apparatus according to the first embodiment, together with the land vehicle seat and the occupant.

As shown in FIGS. 1 to 3, the land vehicle seat 11, which is a front seat, is disposed in the passenger compartment of the land vehicle 10. The land vehicle seat 11 includes a seat cushion 12 and a seat back 13. The seat back 13 extends upward from the rear part of the seat cushion 12 and is inclined rearward. The inclination angle of the seat back 13 is adjustable.

The land vehicle seat 11 is rotatable about a rotation axis (not shown) that extends in the up-down direction. The orientation of the seat back 13 is adjustable through such rotation. In FIGS. 1 to 3, the seat back 13 is oriented in the forward direction of the land vehicle 10. The front-rear direction of the land vehicle 10 agrees with the front-rear direction of the land vehicle seat 11. Also, the width direction of the land vehicle seat 11 agrees with the vehicle width direction. If the land vehicle seat 11 is rotated from the state in which the seat back 13 is oriented in the forward direction of the land vehicle 10, the front-rear direction of the land vehicle seat 11 will be diagonal in relation to both the front-rear direction and the vehicle width direction of the land vehicle 10.

Thus, in the following description, the front-rear direction is defined with reference to the front-rear direction of the land vehicle seat 11 unless otherwise specified. Also, the width direction is defined with reference to the width direction of the land vehicle seat 11. Accordingly, the "front-rear direction" refers to the front-rear direction of the land vehicle seat 11. The "width direction" refers to the width direction of the land vehicle seat 11.

In FIGS. 1 to 3, labels "left" and "right" are used in addition to "front," "rear," "up," and "down." The "left" and "right" refer to leftward and rightward directions in a state in which the front seat occupant P1 is seated in the land vehicle seat 11. The same applies to FIGS. 7 to 9, which will be discussed below.

In order to identify respective sections in the width direction of the seat back 13, a center 13C in the width direction of the seat back 13 is used as a reference. A side closer to the center 13C is defined as an inner side of the seat back 13, while a side farther from the center 13C is defined as an outer side of the seat back 13.

The seat back 13 includes side accommodation portions 15 in outer side portions in the width direction.

The airbag apparatus 20 includes two airbag module ABM1 as main components. The airbag modules ABM1 are respectively accommodated in the side accommodation portions 15. Each airbag module ABM1 includes an airbag 21 and a gas generator 36, which generates inflation gas and supplies it to the airbag 21 through a gas outlet.

There are various types of gas generators that are different in the manner in which inflation gas is generated. In the present embodiment, a pyrotechnic type inflator is employed as the gas generator 36 for each airbag module ABM1. The gas generator 36 of a pyrotechnic type incorporates a gas generating agent (not shown) that generates inflation gas.

In place of the pyrotechnic type gas generator 36, it is possible to use a stored gas type, which discharges inflation gas by breaking a partition wall of a high-pressure gas cylinder filled with high-pressure gas with a low explosive.

Alternatively, a hybrid type in which the pyrotechnic type and stored gas type are combined may be used as the gas generator 36.

The airbag 21 of each airbag module ABM1 includes a side inflation portion 22, a front inflation portion 23, and a tether 35 as indicated by the long-dash double-short-dash lines in FIGS. 1 to 3.

The side inflation portion 22 of each airbag 21 is supplied with inflation gas by the gas generator 36. The inflation gas deploys and inflates the side inflation portion 22 to a space forward of the thorax PT of the front seat occupant P1 from the side accommodation portion 15 with a part; specifically, the part located around the gas generator 36, remaining in the side accommodation portion 15. With respect to the width direction, the side inflation portions 22 are deployed and inflated in regions on the opposite sides of the front seat occupant P1. With respect to the up-down direction, the side inflation portions 22 are deployed and inflated in regions ranging from the shoulders PS to the thorax PT of the front seat occupant P1.

As shown in FIG. 2, the side inflation portion 22 of each airbag 21 includes a protrusion 22A at a position that satisfies Condition 1 and Condition 2 shown below. The protrusion 22A is projected rearward by the inflation gas, so as to push the seat back 13.

Condition 1: The position must be the rear end of a portion that is deployed and inflated in a space forward of the side accommodation portion 15.

Condition 2: The position must be a section on a side of the center of the side inflation portion 22 in the width direction that is opposite to the tether 35.

As shown in FIGS. 1 to 3, the front inflation portion 23 of each airbag 21 is coupled to and continuous with a front end 22F of the side inflation portion 22. Each front inflation portion 23 is deployed and inflated inward in the width direction by the inflation gas that has flowed through the side inflation portion 22. With respect to the front-rear direction, the front inflation portions 23 are deployed and inflated at positions forward of and spaced apart from the upper body of the front seat occupant P1. With respect to the up-down direction, the front inflation portions 23 are deployed and inflated in regions ranging from the head PH to the thorax PT of the front seat occupant P1. Each airbag 21 has a bent shape in which the front inflation portion 23 is bent inward in the width direction in relation to the front end 22F of the side inflation portion 22. The front inflation portions 23 of the airbags 21 are deployed and inflated to the center in the width direction of the land vehicle seat 11. Distal ends 23T of the front inflation portions 23 contact each other at the center of the land vehicle seat 11.

Figure 4:
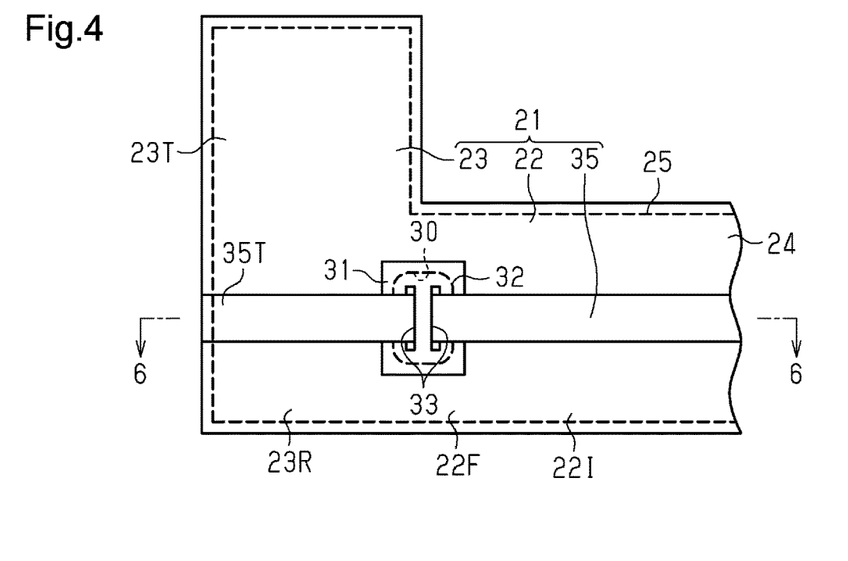
FIG. 4 is a partially developed view illustrating a part of the airbag according to the first embodiment, in an uninflated-and-spread state.
Figure 5:
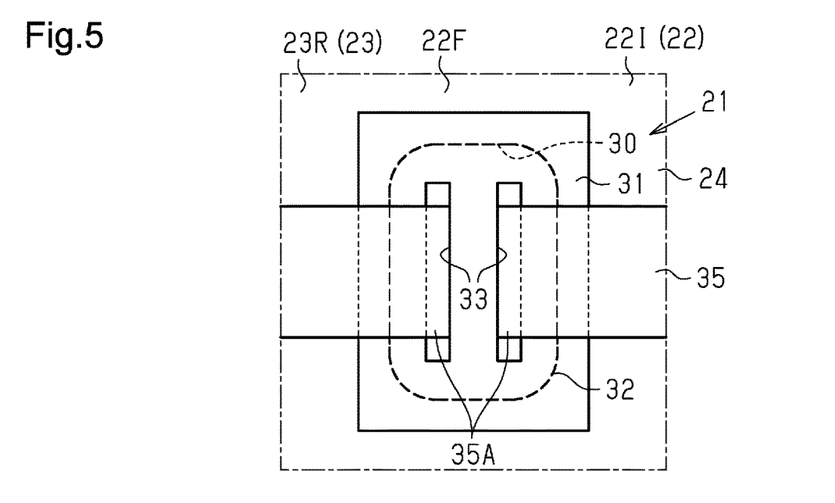
FIG. 5 is an enlarged developed view illustrating part of FIG. 4.
Figure 6:
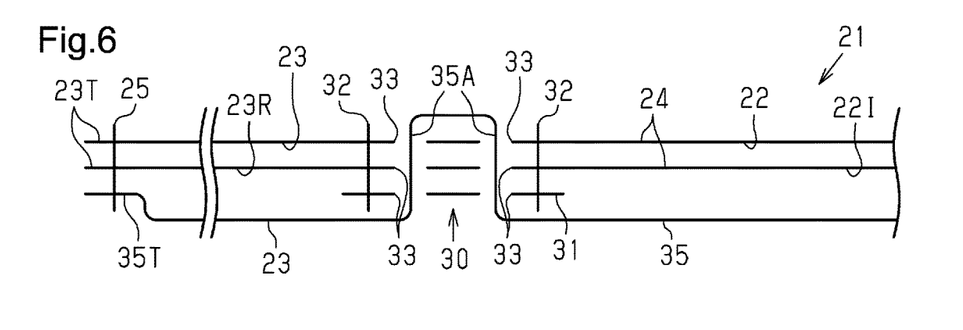
FIG. 6 is a partial cross-sectional view of the airbag, taken along line 6-6 of FIG. 4.

FIGS. 4 and 5 show a state in which a part of the airbag 21 is spread into a planar state without being filled with inflation gas (hereinafter, referred to as an uninflated-and-spread state). In the uninflated-and-spread state, the front inflation portion 23 is not bent inward in the width direction in relation to the side inflation portion 22. FIG. 6 shows a cross-sectional structure of the airbag 21, taken along line 6-6 of FIG. 4.

As shown in FIGS. 4 to 6, the side inflation portion 22 and the front inflation portion 23 of each airbag 21 are formed of a single fabric piece (also referred to as a base fabric or a fabric panel). The fabric piece is made of a material having high strength and flexibility to be easily folded. The material may be, for example, woven fabric formed of polyester threads or polyamide threads. The fabric piece is folded in half along a folding line that is defined at the center. The folding action causes two fabric portions 24 to overlap with each other.

The fabric portions 24 are joined to each other at a peripheral joint portion 25, which is provided at the peripheries of the fabric portions 24 except for the folding line. The peripheral joint portion 25 is formed by sewing the fabric portions 24 with sewing threads. In order to express the seams of sawing threads in FIG. 4, the peripheral joint portion 25 is indicated by a broken line of which the pitch is longer than a typical broken line. The same applies to a loop-shaped joint portion 32, which will be discussed below.

The peripheral joint portion 25 and the loop-shaped joint portion 32 may be formed by a method other than sewing using sewing threads, for example, by using adhesive.

Also, the side inflation portion 22 and the front inflation portion 23 of each airbag 21 may be formed by stacking two or more fabric pieces. In this case, the fabric pieces are joined to each other at a peripheral joint portion provided along the peripheries.

The tether 35 of each airbag 21 is made of a belt-shaped fabric piece. The tethers 35 are made of the same material as that of the side inflation portions 22 and the front inflation portions 23. The tethers 35 become taut when the airbags 21 are deployed and inflated, such that the shapes of the airbags 21 are restricted and maintained at the bent shape.

A non-inflation portion 30 is provided between the side inflation portion 22 and the front inflation portion 23 of each airbag 21. Specifically, the two fabric portions 24 are stacked onto each other in the region between the side inflation portion 22 and the front inflation portion 23. A reinforcing fabric piece 31 is placed outside the two fabric portions 24. Adjacent ones of the fabric portions 24 and the reinforcing fabric piece 31 are brought into contact with each other and joined together by the loop-shaped joint portion 32. The joining is achieved by joining means such as sewing. A region between the fabric portions 24 that is surrounded by the loop-shaped joint portion 32 includes the non-inflation portion 30, which is neither supplied with inflation gas nor inflated. Two slits 33 are formed in the non-inflation portion 30 and the reinforcing fabric piece 31. The slits 33 are parallel with each other and extend in the up-down direction. The side inflation portion 22 and the front inflation portion 23 are continuous with each other through sections above and below the non-inflation portion 30. The reinforcing fabric piece 31 can be omitted.

The tether 35 of each airbag 21 includes a pass-through section 35A at which the tether 35 is passed through the slits 33 of the non-inflation portion 30. As shown in FIG. 2, a portion of each tether 35 between the pass-through section 35A and a distal end 35T is arranged along a rear surface 23R of the front inflation portion 23. A portion of each tether 35 between the pass-through section 35A and a basal end 35B is arranged along an inner surface 221 of the side inflation portion 22 in the width direction.

The basal end 35B of each tether 35 is fixed to a section in the seat back 13 that is close to the rear end 22R of the side inflation portion 22. In the first embodiment, the basal end 35B is fixed to a component of the seat back 13 that has a high stiffness, for example, to the seat frame (not shown). The distal end 35T of each tether 35 is fixed to the distal end 23T of the front inflation portion 23 by joining means such as sewing.

At least the gas outlet of each gas generator 36 is located inside the rear part of the side inflation portion 22. In the first embodiment, each gas generator 36 is entirely accommodated in the rear part of the side inflation portion 22.

Although not illustrated, each airbag 21 is made compact by folding parts except for the part accommodating the gas generator 36. The airbag 21 is folded in this manner in order that it be suitable to be accommodated in the side accommodation portion 15, which has a limited size in the seat back 13.

Each gas generator 36 is disposed in the side accommodation portion 15 together with the airbag 21 and is fastened to the seat frame (not shown) inside the seat back 13.

The airbag apparatus 20 further includes an impact sensor 51 and a controller 52 shown in FIG. 1. The impact sensor 51 includes an acceleration sensor and detects an impact force applied to the land vehicle 10 from ahead or diagonally ahead of the land vehicle seat 11. The controller 52 controls the activation of the gas generators 36 based on a detection signal from the impact sensor 51.

The land vehicle 10 is equipped with an autonomous driving controller (not shown), which drives the land vehicle 10 on behalf of the driver by automatically performing driving operations such as acceleration/deceleration, braking, and steering. The autonomous driving as used in this description includes not only operation of fully automatically driving the land vehicle 10 to a designated destination, but also drive assist that performs part of the operation related to the driving of the land vehicle 10, such as a lane departure prevention function, an inter-vehicle gap keeping function, and a lane control function.

The land vehicle 10 includes a seat belt device 55, which is configured to restrain the front seat occupant P1 seated in the land vehicle seat 11 to the land vehicle seat 11. The components of the seat belt device 55 are disposed in the land vehicle seat 11 such that, even if the land vehicle seat 11 is rotated or if the seat back 13 is reclined during autonomous driving of the land vehicle 10, the seat belt device 55 is capable of restraining the front seat occupant P1 to the land vehicle seat 11. For example, a winder 56 of the seat belt device 55 is disposed inside the seat back 13.

Operation of the first embodiment, which is configured as described above, will now be described. Advantages that accompany the operation will also be described. As a precondition, the front seat occupant P1 seated in the land vehicle seat 11 is assumed to be restrained to the land vehicle seat 11 with the seat belt device 55.

<When the Airbag Apparatus 20 is not Activated>

When the impact sensor 51 is not detecting any impact on the land vehicle 10 from ahead or diagonally ahead of the land vehicle seat 11, the controller 52 does not output activation signals for activating the gas generators 36 to the gas generators 36. Thus, the gas generators 36 do not discharge inflation gas. The airbags 21 continue to be accommodated in the side accommodation portions 15 in a folded state.

<When the Airbag Apparatus 20 is Activated>

When an impact force is applied to the land vehicle 10 from ahead or diagonally ahead of the land vehicle seat 11 due to a collision while the land vehicle 10 is traveling, the front seat occupant P1 starts to move in the direction of the applied impact force.

In a land vehicle that does not have the autonomous driving feature, an airbag apparatus is used that includes an airbag incorporated in the steering wheel or the instrument panel in order to protect a front seat occupant from the above-described impact. This type of airbag apparatus is configured on the assumption that the seat back extends upward while being oriented in the forward direction of the land vehicle. The airbag is deployed and inflated rearward from the steering wheel or the instrument panel, so as to receive and protect the front seat occupant.

However, in a land vehicle having the autonomous driving feature, the autonomous driving may be performed with the seat back oriented in the forward direction and reclined. In such a case, the front seat occupant is farther away in the rearward direction from the steering wheel and the instrument panel as the reclining angle increases, as compared to the case of the above-described assumption. The airbag is deployed and inflated at a position away in the forward direction from the front seat occupant. Further, the steering wheel and the instrument panel restrict forward movement of the airbag, allowing the airbag to restrict forward movement of the front seat occupant. Accordingly, the reclined seat back delays the time at which the airbag starts protecting the occupant from the impact.

In the first embodiment, the impact sensor 51 detects that an impact of a magnitude greater than or equal to a specific value has been applied to the land vehicle 10 from ahead or diagonally ahead of the land vehicle seat 11, for example, due to a collision while the land vehicle 10 is traveling. Based on the detection signal of the impact sensor 51, the controller 52 outputs activation signals to the gas generators 36. In response to the activation signals, the gas generators 36 generate inflation gas. When supplied with the inflation gas, the airbags 21 are inflated while being unfolded (deployed). The side accommodation portions 15 in the seat back 13 are pushed by the airbags 21 and are broken. As indicated by the long-dash double-short-dash lines in FIGS. 1 to 3, the side inflation portion 22 of each airbag 21 is ejected from the seat back 13 to a position forward of the side accommodation portion 15 through the broken portion while partially remaining in the side accommodation portion 15.

As shown in FIG. 2, the side inflation portion 22 of each airbag 21 is deployed and inflated from the side accommodation portion 15 to a position forward of the thorax PT of the front seat occupant P1. After flowing through each side inflation portion 22, the inflation gas is supplied to the front inflation portion 23. Each front inflation portion 23 is deployed and inflated inward in the width direction. The distal ends 23T in the deployment directions of the front inflation portions 23 approach each other through the deployment and inflation. The distal ends 23T lightly contact each other or are pressed against each other.

As the deployment and inflation take place, the tether 35 of each airbag 21 becomes taut. That is, the portion of each tether 35 between the pass-through section 35A and the basal end 35B becomes taut in the front-rear direction along the inner surface 221 of the side inflation portion 22 as the side inflation portion 22 is deployed and inflated. The portion of each tether 35 between the pass-through section 35A and the distal end 35T becomes taut in the width direction along the rear surface 23R of the front inflation portion 23 as the front inflation portion 23 is deployed and inflated. Since the portion of each tether 35 closer to the basal end 35B and the portion closer to the distal end 35T become taut, each airbag 21 is restricted and maintained in a bent shape in which the side inflation portion 22 extends forward from the side accommodation portion 15, and the front inflation portion 23 is bent inward in the width direction in relation to the front end 22F of the side inflation portion 22.

Therefore, even if the front seat occupant P1 starts moving forward or diagonally forward due to inertia, the airbags 21, the shapes of which are restricted and maintained in bent shapes by the tethers 35, restrict the front seat occupant P1 from moving relative to the land vehicle seat 11. Particularly, since the portion of each tether 35 between the pass-through section 35A and the basal end 35B becomes taut, the side inflation portion 22 is restricted from tilting outward in the width direction about the rear end of a portion that is deployed and inflated at a position forward of the side accommodation portion 15. Also, since the portion of each tether 35 between the pass-through section 35A and the distal end 35T becomes taut, the front inflation portion 23 is restricted from tilting forward about the boundary with the side inflation portion 22. This reduces the impact caused by contact between the front seat occupant P1 and components of the land vehicle 10, thereby protecting the front seat occupant P1 from the impact.

Also, in the first embodiment, when each side inflation portion 22 is deployed and inflated, the protrusion 22A is projected rearward by the inflation gas, so as to push the seat back 13. The protrusion 22A is located in a section on a side of the center of the side inflation portion 22 in the width direction that is opposite to the tether 35. Thus, when the protrusion 22A pushes the seat back 13 as described above, the side inflation portion 22 receives a force that tilts the side inflation portion 22 inward in the width direction about the rear end of a portion that is deployed and inflated at a position forward of the side accommodation portion 15. This increases the force with which the side inflation portions 22 of the airbags 21 restrain the front seat occupant P1 from the outer sides in the width direction, so that the airbags 21 protect the front seat occupant P1 more effectively.

In the first embodiment, each airbag 21 includes the side inflation portion 22 and the front inflation portion 23, which are continuous with each other, and the single tether 35. Each airbag 21 has fewer inflation portions than the typical airbag described in the Background section above, which includes multiple (six) inflation portions. Also, each airbag 21 has fewer tethers (tether 35) than each airbag of the typical airbag apparatus described in the Background section above, which includes the first tether and the second tether. Each tether 35 is passed through the non-inflation portion 30. The basal end 35B of each tether 35 is fixed to the seat back 13. The distal end 35T of each tether 35 is fixed to the distal end 23T of the front inflation portion 23. In this manner, the present embodiment has fewer locations at which each tether 35 is fixed than the configuration of the typical airbag apparatus described in the Background section above. Therefore, the structure of each airbag 21 according to the first embodiment is simpler than that of the typical airbag apparatus described in the Background section above, and thus facilitates the manufacture.

Second Embodiment

Figure 7:
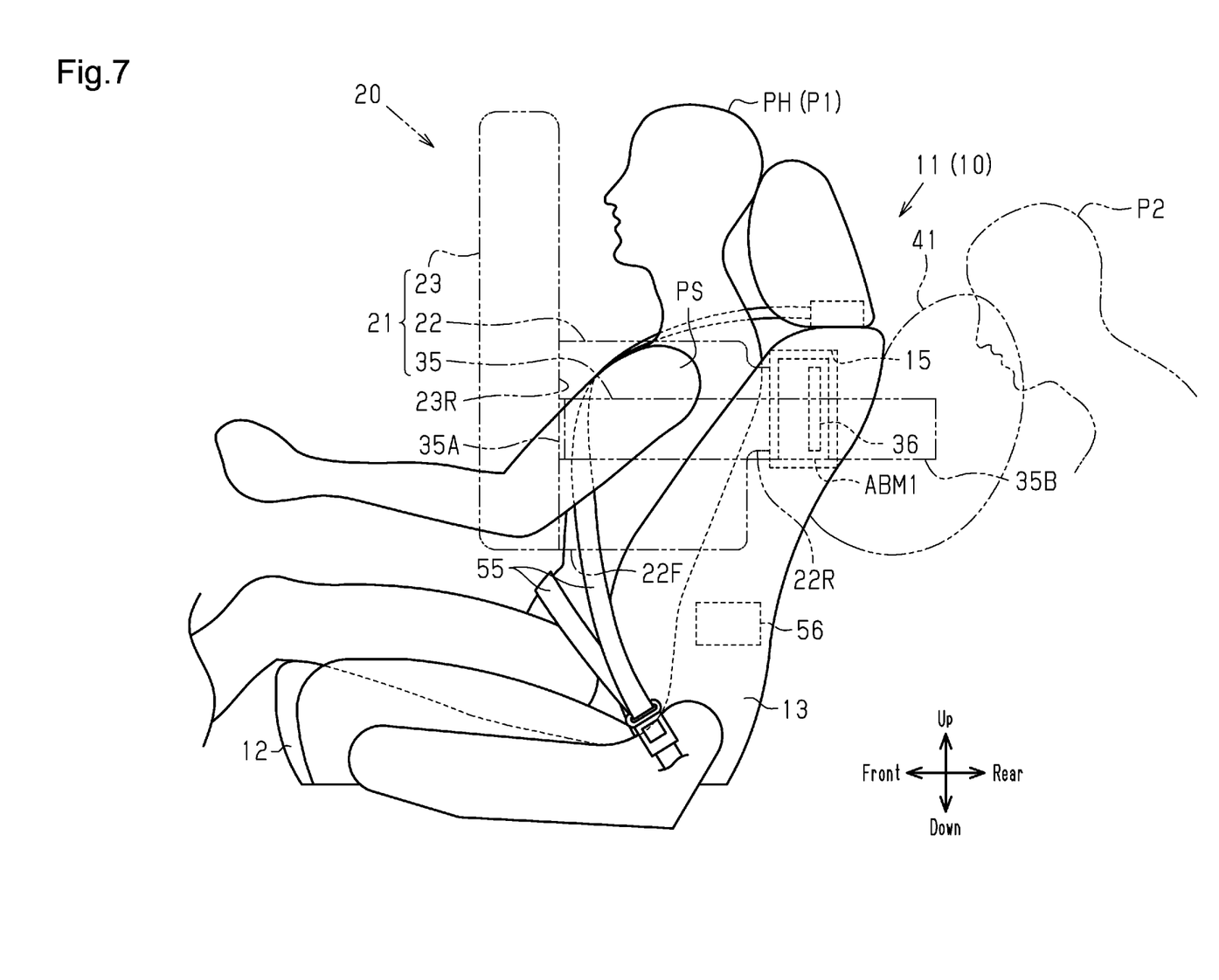
FIG. 7 is a partial side view illustrating an airbag apparatus according to a second embodiment, together with a land vehicle seat and an occupant.
Figure 8:
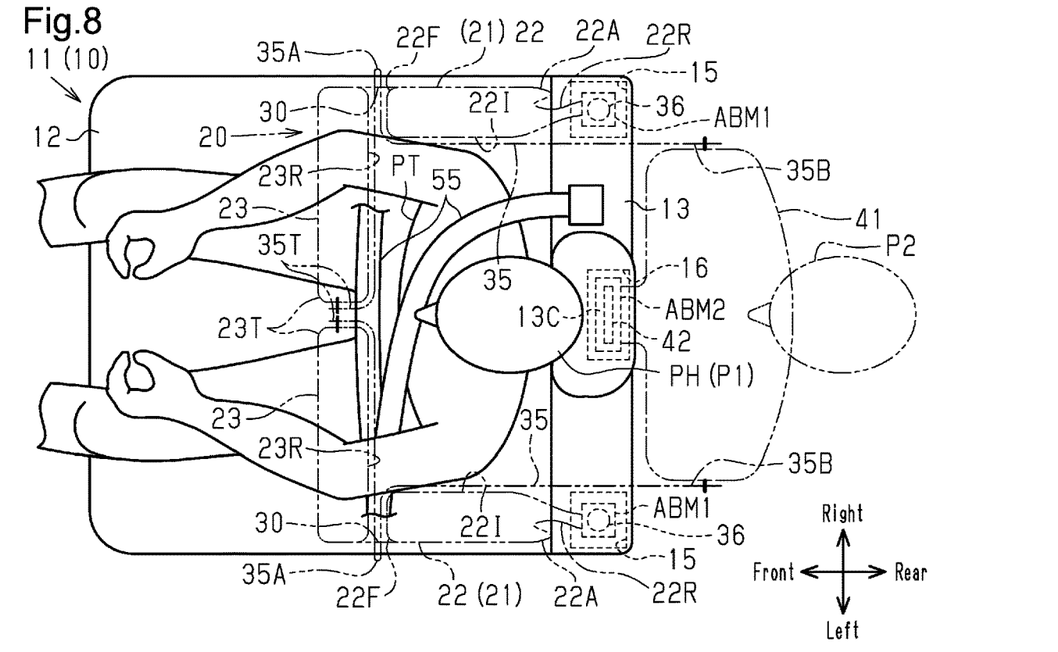
FIG. 8 is a partial plan view illustrating the airbag apparatus according to the second embodiment, together with the land vehicle seat and the occupant.

An airbag apparatus 20 according to a second embodiment will now be described with reference to FIGS. 7 and 8.

Although not illustrated in the first embodiment, the land vehicle 10 includes a rear land vehicle seat (not shown) behind the land vehicle seat 11 in the passenger compartment. It is assumed that a rear seat occupant P2 is seated in this rear land vehicle seat.

In the second embodiment, the seat back 13 includes an intermediate accommodation portion 16 in addition to the side accommodation portions 15. The intermediate accommodation portion 16 is located between the side accommodation portions 15 in the width direction, at a position that includes the center 13C in the second embodiment.

The airbag apparatus 20 of the second embodiment includes an airbag module ABM2 for protecting a rear seat occupant in addition to the airbag modules ABM1 for protecting a front seat occupant. The airbag module ABM2 is accommodated in the intermediate accommodation portion 16.

The airbag module ABM2 includes an airbag 41 and a gas generator 42. The airbag 41 includes a single inflation portion as indicated by the long-dash double-short-dash lines in FIGS. 7 and 8. The airbag 41 is made of the same material as that of the side inflation portion 22 and the front inflation portion 23. The airbag 41 is accommodated in the intermediate accommodation portion 16 in a folded state. The gas generator 42 has the same structure as the gas generator 36. The gas generator 42 generates inflation gas and supplies it to the airbag 41 through a gas outlet.

The inflation gas supplied from the gas generator 42 deploys and inflates the airbag 41 so that the airbag 41 is ejected rearward from the seat back 13, while partially remaining in the intermediate accommodation portion 16. Specifically, a portion around the gas generator 42 remains in the intermediate accommodation portion 16.

Each tether 35 is passed through the seat back 13 in the front-rear direction. The basal end 35B of each tether 35 is fixed to the airbag 41 instead of the seat back 13. The location at which the basal end 35B is fixed is a portion of the airbag 41 that is deployed and inflated at a position rearward of the intermediate accommodation portion 16. The joining is achieved by joining means such as sewing. The activation of the gas generator 42 is controlled by a controller 52 (not shown in FIG. 7).

The configuration, other than the above, is the same as the first embodiment. Thus, the same components as those in the first embodiment are given the same reference numerals, and detailed explanations are omitted.

Operation of the second embodiment, which is configured as described above, will now be described. Advantages that accompany the operation will also be described. As a precondition, the rear seat occupant P2, in addition to the front seat occupant P1, is assumed to be restrained to a land vehicle seat with a seat belt device.

<When the Airbag Apparatus 20 is not Activated>

When the impact sensor 51 is not detecting any impact on the land vehicle 10 from ahead or diagonally ahead of the land vehicle seat 11, the controller 52 does not output activation signals to the gas generators 36, 42. Thus, the gas generators 36, 42 do not discharge inflation gas. Each airbag 21 continues to be accommodated in the side accommodation portion 15 in a folded state. The airbag 41 continues to be accommodated in the intermediate accommodation portion 16 in a folded state.

<When the Airbag Apparatus 20 is Activated>

When an impact force is applied to the land vehicle 10 from ahead or diagonally ahead of the land vehicle seat 11 due to a collision while the land vehicle 10 is traveling, the front seat occupant P1 and the rear seat occupant P2 start to move in the direction of the applied impact force.

The impact sensor 51 detects that an impact of a magnitude greater than or equal to a specific value has been applied to the land vehicle 10 from ahead or diagonally ahead of the land vehicle seat 11, for example, due to a collision while the land vehicle 10 is traveling. Based on the detection signal of the impact sensor 51, the controller 52 outputs activation signals to the gas generators 36, 42. In response to the activation signals, the gas generators 36, 42 generate inflation gas. When supplied with the inflation gas, the airbags 21, 41 are inflated while being unfolded (deployed).

The airbags 21 are deployed and inflated in the same manner as in the first embodiment. The side inflation portion 22 of each airbag 21 is deployed and inflated from the side accommodation portion 15 to a position forward of the thorax PT of the front seat occupant P1. The front inflation portion 23 of each airbag 21 is deployed and inflated inward in the width direction from the front end 22F of the side inflation portion 22. The distal ends 23T of the front inflation portions 23 approach and contact each other through the deployment and inflation.

Also, when supplied with inflation gas, the airbag 41 in the intermediate accommodation portion 16, the airbag 41 is deployed and inflated rearward from the intermediate accommodation portion 16.

As the deployment and inflation of the airbags 21, 41 take place, the tethers 35 are pulled harder than in the first embodiment, and become taut. That is, the portion of each tether 35 between the pass-through section 35A and the distal end 35T becomes taut in the width direction along the rear surface 23R of the front inflation portion 23 as the front inflation portion 23 is deployed and inflated. Also, the portion of each tether 35 between the pass-through section 35A and the basal end 35B becomes taut in the front-rear direction along the inner surface 221 of the side inflation portion 22 as the side inflation portion 22 is deployed and inflated.

Additionally, the tethers 35 are pulled rearward by the airbag 41, which is deployed and inflated. Accordingly, the tethers 35 are tauter than the first embodiment. This increases the force with which the tethers 35 restrict and maintain the airbags 21 at the above-described bent shapes.

Therefore, even if the front seat occupant P1 starts moving forward or diagonally forward due to inertia, the airbags 21, the shapes of which are restricted and maintained in the bent shapes by the tethers 35, further effectively restrict the front seat occupant P1 from moving relative to the land vehicle seat 11. Particularly, since the portion of each tether 35 between the pass-through section 35A and the basal end 35B becomes taut, the side inflation portion 22 is further effectively restricted from tilting outward in the width direction about the rear end of a portion that is deployed and inflated at a position forward of the side accommodation portion 15. Also, since the portion of each tether 35 between the pass-through section 35A and the distal end 35T becomes taut, the front inflation portion 23 is further effectively restricted from tilting forward about the boundary with the side inflation portion 22. This reduces the impact caused by contact between the front seat occupant P1 and components of the land vehicle 10, thereby further effectively protecting the front seat occupant P1 from the impact.

Also, the rear seat occupant P2 is received by the airbag 41 from the front. This reduces the impact caused by contact between the rear seat occupant P2 and the land vehicle seat 11 ahead. The rear seat occupant P2 is therefore protected.

The second embodiment also has fewer inflation portions and fewer tethers 35 than the configuration of the typical airbag apparatus described in the Background section above. Although the basal end 35B of each tether 35 is fixed to the airbag 41 instead of the seat back 13, the present embodiment has fewer locations at which the tether 35 is fixed than the configuration of the typical airbag apparatus described in the Background section above. Therefore, the structure of each airbag 21 according to the second embodiment is also simpler than that of the typical airbag apparatus described in the Background section above, and thus facilitates the manufacture.

Third Embodiment

Figure 9:
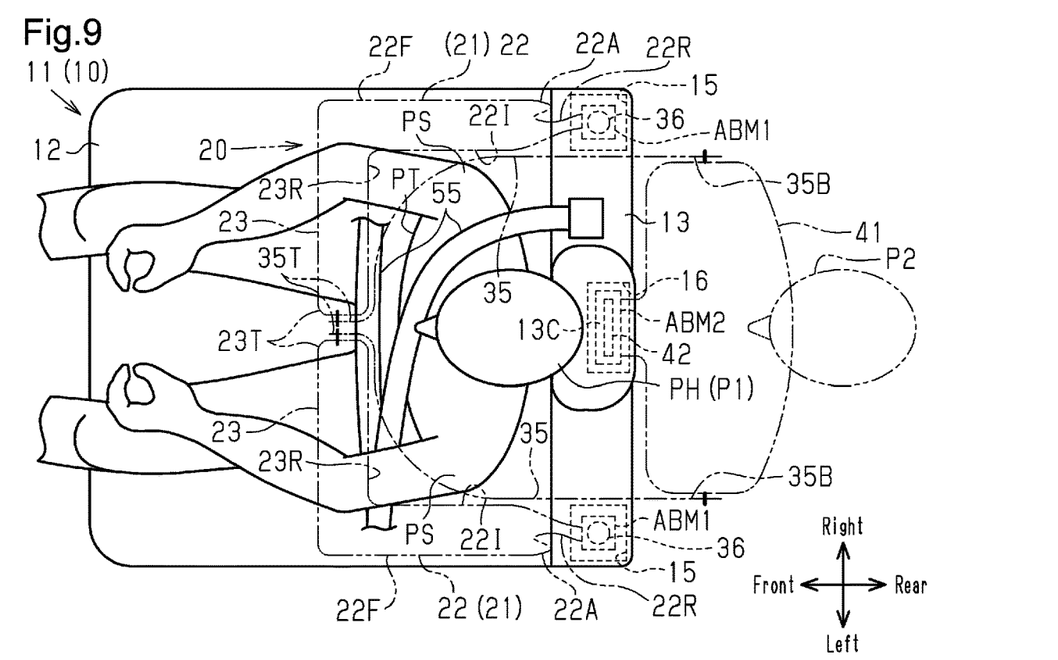
FIG. 9 is a partial plan view illustrating an airbag apparatus according to a third embodiment, together with a land vehicle seat and an occupant.

An airbag apparatus 20 according to a third embodiment will now be described with reference to FIG. 9.

The third embodiment is different from the second embodiment in the configurations of each airbag 21. That is, each airbag 21 includes a side inflation portion 22 and a front inflation portion 23 that is coupled to and continuous with a front end 22F of the side inflation portion 22. However, each airbag 21 does not have a non-inflation portion 30 at the boundary between the side inflation portion 22 and the front inflation portion 23. Accordingly, each tether 35 is not passed through a non-inflation portion 30.

Other than the differences described above, the third embodiment is the same as the second embodiment. Thus, the same components as those in the second embodiment are given the same reference numerals, and detailed explanations are omitted.

The third embodiment thus achieves the same operation and advantages as the second embodiment. That is, when an impact is applied to the land vehicle 10 from ahead or diagonally ahead of the land vehicle seat 11, for example, due to a collision while the land vehicle 10 is traveling, the gas generators 36, 42 generate inflation gas. The inflation gas is supplied to the airbags 21, 41, deploying and inflating the airbags 21, 41.

As the deployment and inflation take place, the tether 35 of each airbag 21 becomes taut. However, the tethers 35 become taut in a manner different from those in the first and second embodiments. Each tether 35 does not extend along the inner surface 221 of the side inflation portion 22 when becoming taut. Also, each tether 35 does not extend along the rear surface 23R of the front inflation portions 23 when becoming taut. An intermediate portion of each tether 35 in the longitudinal direction contacts the shoulder PS of the front seat occupant P1. Each tether 35 becomes taut between the portion contacting the shoulder PS and the basal end 35B and between the portion contacting the shoulder PS and the distal end 35T.

In the third embodiment also, the tether 35 of each airbag 21 is pulled rearward by the airbag 41, which is deployed and inflated. Each airbag 21 is restricted and maintained in a bent shape in which the side inflation portion 22 extends forward from the side accommodation portion 15, and the front inflation portion 23 is bent in relation to the front end 22F of the side inflation portion 22 to extend inward in the width direction.

Therefore, even if the front seat occupant P1 starts moving forward or diagonally forward due to inertia, the airbags 21, the shapes of which are restricted and maintained in the bent shapes by the tethers 35, restrict the front seat occupant P1 from moving relative to the land vehicle seat 11. Particularly, since each tether 35 becomes taut, the front inflation portion 23 is restricted from tilting forward about the boundary with the side inflation portion 22. This reduces the impact caused by contact between the front seat occupant P1 and components of the land vehicle 10, thereby protecting the front seat occupant P1 from the impact.

The third embodiment also has fewer inflation portions and fewer tethers 35 than the typical airbag apparatus described in the Background section above. The third embodiment has fewer locations at which each tether 35 is fixed than the typical airbag apparatus described in the Background section above. Therefore, the structure of each airbag 21 according to the third embodiment is also simpler than that of the typical airbag apparatus described in the Background section above, and thus facilitates the manufacture.

The above-described embodiments may be modified as follows. The above-described embodiments and the following modifications can be combined as long as the combined modifications remain technically consistent with each other.

The gas generators 36, 42 may be disposed in any manner different from those in the above-described embodiments as long as at least the gas outlets are disposed inside the airbags 21, 41. For example, only parts of the gas generators 36, 42 that include the gas outlets may be accommodated in the airbags 21, 41.

The dimension in the up-down direction, the position of the upper end, and the position of the lower end of the side inflation portion 22 of each airbag 21 may be changed.

Also, the dimension in the up-down direction, the position of the upper end, and the position of the lower end of the front inflation portion 23 of each airbag 21 may be changed.

In the first embodiment, the basal end 35B of the tether 35 of each airbag 21 may be joined to the rear end 22R of the side inflation portion 22 instead of a component of the seat back 13. The joining may be achieved by a joining means such as sewing.

<Applicability>

The land vehicle 10, in which the above-described airbag apparatus 20 is employed, includes various industrial vehicles in addition to private cars.

The above-described airbag apparatus 20 may also be applied to an airbag apparatus installed in seats in vehicles other than the land vehicle 10, including aircraft and ships.

OTHER MODIFICATIONS

The airbag apparatus 20 according to the first embodiment may be mounted on a rear land vehicle seat.

The controller 52 may be changed to have a configuration that outputs activation signals to the gas generators 36, 42 when the controller 52 predicts that an impact force will be applied to the land vehicle 10 from ahead or diagonally ahead of the land vehicle seat 11.

The airbag apparatus 20 is particularly advantageous when employed in the land vehicle 10, which has the autonomous driving feature, but may be employed in a manually operated normal land vehicle. In this case also, the airbag apparatus 20 restricts the front seat occupant P1 from moving relative to the land vehicle seat 11, so as to further effectively protect the front seat occupant P1.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An airbag apparatus configured to be used for a vehicle seat,
wherein
the vehicle seat includes a seat back,
a side closer to a center in a width direction of the seat back is defined as an inner side, and a side farther from the center is defined as an outer side, and
the seat back includes side accommodation portions respectively provided in side portions on the outer sides,
the airbag apparatus comprising two airbags respectively accommodated in the accommodation portions,
the airbags have bent shapes including:
two side inflation portions that are configured to be supplied with inflation gas and to be deployed and inflated from the side accommodation portions and adapted so as to be positioned when deployed and inflated to positions forward of a thorax of an occupant seated in the vehicle seat; and
two front inflation portions that are coupled to front ends of the side inflation portions and configured to be deployed and inflated toward the inner side by the inflation gas that has flowed through the side inflation portions,
each airbag further includes a tether that is configured to become taut as the airbag is deployed and inflated so as to restrict and maintain the airbag at the bent shape,
each airbag includes a non-inflation portion between the side inflation portion and the front inflation portion,
each tether includes a pass-through section at which the tether is passed through the non-inflation portion,
a portion of each tether between the pass-through section and a distal end is arranged along a rear surface of the front inflation portion,
a portion of each tether between the pass-through section and a basal end is arranged along an inner surface in the width direction of the side inflation portion,
the basal end of each tether is configured to be fixed to a rear end of the side inflation portion or the seat back, and
the distal end of each tether is fixed to a front end of the front inflation portion.

2. The airbag apparatus according to claim 1, wherein
each airbag includes a protrusion that is configured to be projected rearward by the inflation gas, so as to push the seat back, and
the protrusion is provided in a section of each side accommodation portion, the section being at a rear end of a portion that is configured to be deployed and inflated at a position forward of the side accommodation portion, and the section being located on a side of a center of the side inflation portion in the width direction that is opposite to the tether.

3. An airbag apparatus configured to be used for a vehicle seat,
wherein
the vehicle seat includes a seat back,
a side closer to a center in a width direction of the seat back is defined as an inner side, and a side farther from the center is defined as an outer side,
the seat back includes side accommodation portions respectively provided in side portions on the outer sides,
an intermediate accommodation portion is provided between the side accommodation portions, the airbag apparatus comprises two airbags respectively accommodated in the side accommodation portions, the airbags have bent shapes including:
- two side inflation portions that are configured to be supplied with inflation gas and to be deployed and inflated from the side accommodation portions and adapted so as to be positioned when deployed and inflated to positions forward of a thorax of an occupant seated in the vehicle seat; and
- two front inflation portions that are coupled to front ends of the side inflation portions and configured to be deployed and inflated toward the inner side by the inflation gas that has flowed through the side inflation portions, each airbag further includes a tether that is configured to become taut as the airbag is deployed and inflated so as to restrict and maintain the airbag at the bent shape, the airbag apparatus further comprises an airbag for protecting a rear seat occupant that is configured to be accommodated in the intermediate accommodation portion and to be deployed and inflated rearward from the intermediate accommodation portion by inflation gas, a basal end of each tether is fixed to a portion of the airbag for protecting a rear seat occupant that is deployed and inflated at a position rearward of the intermediate accommodation portion, and a distal end of each tether is fixed to a front end of the front inflation portion.

4. The airbag apparatus according to claim 3, wherein
each airbag includes a protrusion that is configured to be projected rearward by the inflation gas, so as to push the seat back, and the protrusion is disposed in a section of each side accommodation portion, the section being at a rear end of a portion that is configured to be deployed and inflated at a position forward of the side accommodation portion, and the section being located on a side of a center of the side inflation portion in the width direction that is opposite to the tether.

\* \* \* \* \*